United States Patent
Suzuki

(10) Patent No.: US 8,339,080 B2
(45) Date of Patent: Dec. 25, 2012

(54) MOTOR CONTROL APPARATUS AND ELECTRIC POWER STEERING SYSTEM USING THE SAME

(75) Inventor: Takashi Suzuki, Obu (JP)

(73) Assignee: Denso Corporation, Kariya (JP)

( * ) Notice: Subject to any disclaimer, the term of this patent is extended or adjusted under 35 U.S.C. 154(b) by 186 days.

(21) Appl. No.: 13/013,041

(22) Filed: Jan. 25, 2011

(65) Prior Publication Data

US 2011/0199030 A1      Aug. 18, 2011

(30) Foreign Application Priority Data

Feb. 15, 2010   (JP) .................................. 2010-29983

(51) Int. Cl.
*H02P 6/20* (2006.01)
(52) U.S. Cl. .......... 318/400.26; 318/400.11; 318/400.21
(58) Field of Classification Search ............ 318/400.21, 318/400.26, 400.27, 400.3, 459, 479, 504, 318/400.11, 430, 431
See application file for complete search history.

(56) References Cited

U.S. PATENT DOCUMENTS

| | | | |
|---|---|---|---|
| 4,999,561 A | 3/1991 | Kaga et al. | |
| 5,245,294 A * | 9/1993 | Kumar ........................... | 324/677 |
| 6,097,107 A * | 8/2000 | Ikeda ........................... | 307/10.7 |
| 7,439,697 B2 | 10/2008 | Miyazaki et al. | |
| 8,154,241 B2 | 4/2012 | Suzuki | |
| 2011/0156626 A1 * | 6/2011 | Mukai et al. ............. | 318/400.21 |

FOREIGN PATENT DOCUMENTS

| | | |
|---|---|---|
| EP | 2 075 903 | 7/2009 |
| JP | 03-007094 | 1/1991 |
| JP | 5-260759 | 10/1993 |
| JP | 7-7807 | 1/1995 |
| JP | P2005-073399 A | 3/2005 |
| JP | 2006-50707 | 2/2006 |
| JP | P2007-151366 A | 6/2007 |
| JP | P2009-303315 A | 12/2009 |

* cited by examiner

*Primary Examiner* — Bentsu Ro
(74) *Attorney, Agent, or Firm* — Nixon & Vanderhye, PC

(57) ABSTRACT

A motor control apparatus has an inverter circuit, which includes FETs for converting electric power supplied to a motor. A capacitor is provided between a battery and the inverter circuit. A pull-up resistor connects a V-phase of the motor to a high potential side of the battery. A power supply relay permits or interrupts current flow from the battery to the capacitor and the motor. A microcomputer controls the power supply relay and the motor. The microcomputer turns on a low-side FET of a V-phase under a condition that the power supply relay is interrupting the current flow before the motor is started. Electric charge stored in the capacitor is discharged to a low potential side of the battery through the pull-up resistor.

17 Claims, 8 Drawing Sheets

MOTOR CONTROL APPARATUS AND ELECTRIC POWER STEERING SYSTEM USING THE SAME

CROSS REFERENCE TO RELATED APPLICATION

This application is based on and incorporates herein by reference Japanese Patent Application No. 2010-29983 filed on Feb. 15, 2010.

FIELD OF THE INVENTION

The present invention relates to a motor control apparatus and an electric power steering system using the same.

BACKGROUND OF THE INVENTION

A conventional motor control apparatus controls operation of a motor (rotary electric machine) by controlling turning on and off of a plurality of switching elements. The motor control apparatus generally has a capacitor to suppress ripple currents, which are generated when electric power is supplied from an electric power source to a motor. An electric power supply relay is provided between the power source and the capacitor to permit or interrupt flow of current from the power source to the capacitor and the motor by controlling turning on and off of the power supply relay.

In case that the motor is used in an electric power steering system, failure (abnormality) check is performed to check whether the motor control apparatus has any failure in its electric circuits or the like before the motor is started to operate. This failure check may not be performed accurately, if the capacitor stores remaining electric charge therein. For example, the power supply relay is checked whether it has a short-circuit failure, in which the power supply relay is persistently in the turned-on state irrespective of being controlled to turn on and off. In this case, a voltage developed at the motor side is detected under a condition that the power supply relay is controlled to the turned-off state, in which the power source and the motor are disconnected electrically. If the capacitor still stores electric charge therein, a voltage developed by the capacitor is detected as the voltage of the motor side. As a result, the power supply relay is determined erroneously to be in the short-circuit failure, even though the power supply relay has no such failure. If the failure check operation thus is not performed properly, it takes some time for the electric power steering system to start its operation.

For example, if an air-conditioner, headlights, wipers and the like of a vehicle consume large electric power while the electric power steering system is in operation, the electric power supply to the motor may be interrupted temporarily and the motor of the electric power steering system may be disabled to operate temporarily. The motor is desired to restore its normal operation in such a case. It is therefore necessary to perform the failure check operation accurately and without delay. If the voltage developed by the capacitor is applied to the switching element, to which a fixed control signal is not applied, under a condition that the capacitor still stores electric charge, the switching element is likely to be damaged. To solve the above drawback, the following patent documents 1 and 2 propose that the motor control apparatus is configured to discharge the electric charge remaining in the capacitor.

Patent document 1: JP 7-7807A
Patent document 2: 2008-94342A (EP 2 075 903 A1)

However, according to patent document 1, a motor control apparatus requires an electric circuit (switches, resistors and the like) exclusive to discharge electric charge of the capacitor and thus results in increase in size and cost.

According to patent document 2, a motor control apparatus has no circuit exclusive to discharge but is configured to discharge electric charge of a capacitor through a motor without influencing on torque of the motor. Although it is so configured not to influence on the torque in theory, it is practically difficult to discharge the capacitor without influence on the torque due to variations in associated devices. For this reason, the circuit or the like may be damaged by rapid power supply caused by the discharge. If the motor control apparatus is used in the electric power steering system, a driver may feel uneasiness because of unexpected operation of the motor. Since the motor control apparatus supplies the motor with discharge current not to influence on the torque, it is necessary to check whether a position sensor (rotation angle sensor), switching elements, a current sensor and the like for the motor need be checked as to whether they are normal or in failure. The motor control apparatus thus is required to perform complicated check processing and needs time to complete discharging.

SUMMARY OF THE INVENTION

It is therefore an object of the present invention to provide a motor control apparatus, which discharges a capacitor without delay.

According to the present invention, a motor control apparatus is provided for controlling a motor, which has a winding set of a plurality of phase coils and is driven by electric power supplied from a power source. The motor control apparatus comprises an electric power converter, a capacitor, a resistor, a power supply relay and a control circuit. The electric power converter circuit converts the electric power supplied to the motor. The electric power converter includes a plurality of pairs of switching elements provided in correspondence to the plurality of phase coils. Each pair of switching elements includes a high-side switching element and a low-side switching element provided at a high potential side and a low potential side of the power source, respectively. The capacitor is connected between the power source and the electric power converter circuit. The resistor is connected between a predetermined one of the phase coils and one of the high potential side and the low potential side of the power source. The power supply relay is connected to permit and interrupt current flow from the power source to the capacitor and the motor. The control circuit is provided to control operation of the power supply relay and driving of the motor by turning on and off the switching elements. The control circuit is configured to discharge electric charge stored in the capacitor to the low potential side of the power source through the resistor before the motor is started to operate, by turning on one of the high-side switching element and the low-side switching element connected to the predetermined one of the phase coils under a condition that the power supply relay is in a turned-off state. The one of the high-side switching element and the low-side switching element connected to the predetermined one of the phase coils is in series with the resistor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
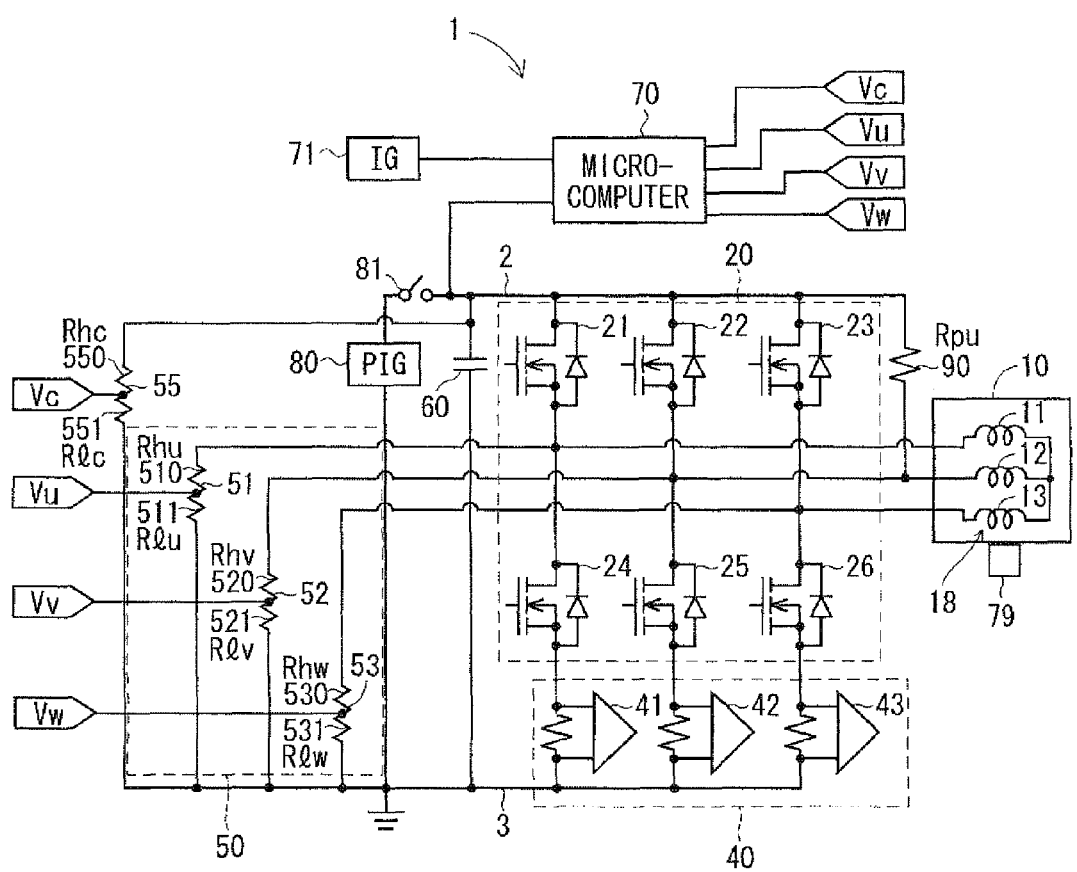
FIG. 1 is a circuit diagram showing a motor control apparatus according to a first embodiment of the present invention.

A motor control apparatus according to the present invention will be described in detail with reference to a plurality of embodiments, in which same or similar parts are designated by the same or similar reference numerals for brevity of description.

First Embodiment

Referring first to FIG. 1, a motor control apparatus 1 according to a first embodiment is provided for controlling an operation of an electric motor 10, which is a rotary electric machine. The motor control apparatus 1 and the motor 10 are used, for example, in an electric power steering system (EPS), which power-assists a steering operation of a vehicle.

The motor 10 is a three-phase brushless motor, which has a rotor and a stator (not shown). The rotor is a cylindrical member, which has permanent magnets and magnetic poles thereon. The stator houses and rotatably supports the rotor therein. The stator has protrusions extending in a radially inner direction and arranged at a predetermined angular interval in a circumferential direction. Three phase coils, that are, a U-phase coil 11, a V-phase coil 12 and a W-phase coil 13, are wound on the protrusions. The U-phase coil 11, the V-phase coil 12 and the W-phase coil 13 are windings for a U-phase, a V-phase and a W-phase of the three-phase brushless motor 10, respectively, which form one winding set 18 in the motor 10. A position sensor 79 is provided in the motor 10 to detect rotation positions of the rotor.

The control apparatus 1 includes an inverter circuit 20 provided as an electric power converter, a capacitor 60, a pull-up resistor 90 provided as a high-side resistor, an electric power supply relay 81, a microcomputer 70 provided as a control circuit, a terminal voltage detection circuit 50 and a capacitor voltage detection circuit 55. The inverter circuit 20 is a three-phase inverter, in which six switching elements 21 to 26 are connected to turn on and off current supply to each of the U-phase coil 11, the V-phase coil 12 and the W-phase coil 13 among the winding set 18. The switching elements 21 to 26 are each metal-oxide-semiconductor field-effect transistor (MOSFET). The switching elements 21 to 26 are referred to FETs 21 to 26, respectively.

Three FETs 21 to 23 have drains, which are connected to a positive bus (high potential bus) 2 connected to a positive side of a battery 80 provided as an electric power source (PIG). The FETs 21 to 23 have sources, which are connected to drains of the FETs 24 to 26, respectively. The FETs 24 to 26 have sources, which are connected to a negative bus (low potential bus) 3 connected to a negative side of the battery 80. The negative bus 3 is grounded.

The FETs 21 and 24 are connected in series as a pair and a junction therebetween is connected to one end of the U-phase coil 11. The FETs 22 and 25 are connected in series as a pair and a junction therebetween is connected to one end of the V-phase coil 12. The FETs 23 and 26 are connected in series as a pair and a junction therebetween is connected to one end of the W-phase coil 13. The three pairs are connected in parallel one another.

The FETs 21 to 23 are high-side switching elements in the inverter circuit 20. The FETs 24 to 26 are low-side switching elements in the inverter circuit 20. Each of the high-side switching elements is referred to as a high-side FET and each of the low-side switching elements is referred to as a low-side FET. Each FET is also referred to as, for example, U-phase low-side FET 24, in combination with a corresponding phase.

The motor control apparatus 1 thus has one inverter circuit 20. The inverter circuit 20 is controllable by the microcomputer 70 and is configured to convert the DC electric power supplied from the battery 80 to the motor 10 so that the motor 10 is rotated thereby.

The capacitor 60 is connected at its one end to the positive bus 2 at a position between the battery 80 and the inverter circuit 20. The capacitor 60 is also connected at its other end to the negative bus 3 at a position between the inverter circuit 20 and the battery and FET 24 and the ground. The capacitor 60 is thus provided between the battery 80 and the inverter circuit 20. The capacitor 60 stores electric charge therein to supplement power supply to the FETs 21 to 26 and suppress ripple currents, which are generated when electric power is supplied from the battery 80 to the motor 10.

The pull-up resistor 90 provided as the high-side resistor is connected to a predetermined one of the three-phase coils, for example, V-phase coil 12, which is a V-phase winding of the motor 10, and the high potential side of the battery 80. The pull-up resistor 90 is thus connected in parallel to the high-side FET 22 and in series with the low-side FET 25. The V-phase coil 12 of the motor 10 is thus pulled up. The pull-up resistor 90 has a resistance, which is larger than respective resistances of the U-phase coil 11, the V-phase coil 12 and the W-phase coil 13. The resistance of the pull-up resistor 90 is set to be more than 100 times larger than each resistance of the U-phase coil 11, the V-phase coil 12 and the W-phase coil 13. The resistance of the pull-up resistor 90 is indicated as Rpu.

The power supply relay 81 is provided in the positive bus 2 between the battery 80 and the capacitor 60. The power supply relay 81 is controlled to turn on or off by the microcomputer 70 to permit or interrupt current flow between the battery 80 and the capacitor 60 as well as the motor 10 as described below. The power supply relay 81 is a normally-open relay. The power supply relay 81 is open (turned off) and interrupts the current flow, when no turn-on command is applied from the microcomputer 70. The power supply relay 81 is closed (turned on) to permit the current flow, when the turn-on command is applied from the microcomputer 70.

The microcomputer 70 includes integrated circuits and connects to various parts and sensors of the motor control apparatus 1. The microcomputer 70 stores various programs in its memory unit and executes various operation processing including the check processing based on the stored programs to control operations of the various parts, such as the power supply relay 81 and FETs 21 to 26, to which the microcomputer 70 is connected. Connections of the microcomputer 70 to the power supply relay 81 and the FETs 21 to 26 are not shown in FIG. 1 for avoiding complication. The microcomputer 70 is connected also to an ignition electric power source (IG) 71. The microcomputer 70 starts various operation processing with electric power supplied from the ignition power source 71 to the microcomputer 70, when an ignition key (not shown) is turned on by a driver of the vehicle.

The microcomputer 70 applies the turn-on command signal to the power supply relay 81 and turns on the power supply relay 81 thereby to permit the current flow from the battery 80 to the capacitor 60 and the motor 10. The microcomputer 70, on the other hand, does not apply the turn-on command signal to the power supply relay 81 so that the power supply relay 81 remains in the normal off-state to interrupt the current from the battery 80 to the capacitor 60 and the motor 10. The microcomputer 70 thus controls permission and interruption of the current flow by electrically controlling the operation of the power supply relay 81.

The microcomputer 70 further turns on and off the FETs 21 to 26 of the inverter circuit 20, when the current is permitted to flow by the power supply relay 81. Thus, the inverter circuit 20 converts a DC current from the battery 80 to sine wave currents, which have different phases, so that the motor 10 is thus driven to rotate. The microcomputer 70 regulates torque and rotation speed of the motor 10 by pulse-width modulation (PWM) control. The microcomputer 70 controls driving of the motor 10 by switching turning-on and turning-off of the FETs 21 to 26.

A current detection circuit 40 is provided between the inverter circuit 20 and the negative bus 3. The current detection circuit 40 includes a U-phase current sensor 41, a V-phase current sensor 42 and a W-phase current sensor 43. The U-phase current sensor 41 is provided between the U-phase low-side FET 24 and the ground to detect a U-phase current, which flows in the U-phase coil 11. The V-phase current sensor 42 is provided between the V-phase low-side FET 25 and the ground to detect a V-phase current, which flows in the V-phase coil 12. The W-phase current sensor 43 is provided between the W-phase low-side FET 26 and the ground to detect a W-phase current, which flows in the W-phase coil 12.

Each of the current sensors 41 to 43 is formed of a shunt resistor and an amplifier. The currents detected by the current sensors 41 to 43, that is, current detection values, are inputted to the microcomputer 70. The rotation position of the motor 10 detected by the position sensor 79 is also inputted to the microcomputer 70.

The terminal voltage detection circuit 50 includes a U-phase voltage sensor 51, a V-phase voltage sensor 52 and a W-phase voltage sensor 53. The U-phase voltage sensor 51 is provided between a junction of the U-phase high-side FET 21 and the U-phase low-side FET 24 and the ground to detect a voltage applied to the U-phase coil 11, that is, a U-phase voltage developed at a terminal of the U-phase coil 11. The V-phase voltage sensor 52 is provided between a junction of the V-phase high-side FET 22 and the V-phase low-side FET 25 and the ground to detect a voltage applied to the V-phase coil 12, that is, a V-phase voltage developed at a terminal of the V-phase coil 12. The W-phase voltage sensor 53 is provided between a junction of the W-phase high-side FET 23 and the W-phase low-side FET 26 and the ground to detect a voltage applied to the W-phase coil 13, that is, a W-phase voltage developed at a terminal of the W-phase coil 13.

The U-phase voltage sensor 51 includes a U-phase high-side resistor 510 and a U-phase low-side resistor 511 connected in series. The microcomputer 70 is connected to a junction between the resistor 510 and the resistor 511. Thus, a voltage Vu of the terminal of the U-phase coil 11 detected by the voltage sensor 51 is inputted to the microcomputer 70. The V-phase voltage sensor 52 includes a V-phase high-side resistor 520 and a V-phase low-side resistor 521 connected in series. The microcomputer 70 is connected to a junction between the resistor 520 and the resistor 521. Thus, a voltage Vu of the terminal of the V-phase coil 12 detected by the voltage sensor 52 is inputted to the microcomputer 70. The W-phase voltage sensor 53 includes a W-phase high-side resistor 530 and a W-phase low-side resistor, 531 connected in series. The microcomputer 70 is connected to a junction between the resistor 530 and the resistor 531. Thus, a voltage Vw of the terminal of the W-phase coil 13 detected by the voltage sensor 53 is inputted to the microcomputer 70. Detection values of the voltages detected by the voltage sensors 51 to 53 are referred to as terminal voltage detection values. Resistances of the resistors 510, 511, 520, 521, 530 and 531 are indicated as Rhu, Rlu, Rhv, Rlv, Rhw and Rlw, respectively.

A capacitor voltage detection circuit 55 is connected to a junction between the positive bus 2 and the capacitor 60 at its one end and to the ground at its other end thereby to detect a voltage of the capacitor 60. The capacitor voltage detection circuit 55 includes a high-side resistor 550 and a low-side resistor 551 connected in series. The microcomputer 70 is connected to a junction between the high-side resistor 550 and the low-side resistor 551. Thus, a voltage of the capacitor 60 detected by the capacitor voltage detection circuit 55 is inputted to the microcomputer 70. A detection value of the voltage detected by the capacitor voltage detection circuit 55 is indicated as a capacitor voltage detection value Vc. Resistances of the resistor 550 and the resistor 551 are indicated as Rhc and Rlc, respectively. Connections of the current detection circuit 40, the terminal voltage detection circuit 50, the capacitor voltage detection circuit 55 and the position sensor 79 to the microcomputer 70 are not shown to avoid complication.

The pull-up resistor 90 connects the V-phase coil 12, which is the winding of the V-phase of the motor 10, to the high potential side of the battery 80. According to this configuration, the microcomputer 70 detects failure in the windings, that is, which one of the phase coils (U-phase coil 11, V-phase coil 12 and W-phase coil 13) has disconnection, based on the terminal voltage of each phase detected by the terminal voltage detection circuit 50 under a condition that the power supply relay 81 is in the on-state, that is, while the current flow from the battery 80 to the capacitor 60 and the motor 10 is permitted. For example, the microcomputer 70 determines that the U-phase coil 11 is disconnected when the ground voltage is detected by only the U-phase voltage sensor 51. The microcomputer 70 determines that the V-phase coil 12 is disconnected when the ground voltage is detected by both of the U-phase voltage sensor 51 and the W-phase voltage sensor 53. The microcomputer 70 determines that the W-phase coil 13 is disconnected when the ground voltage is detected by only the W-phase voltage sensor 53.

Figure 2:
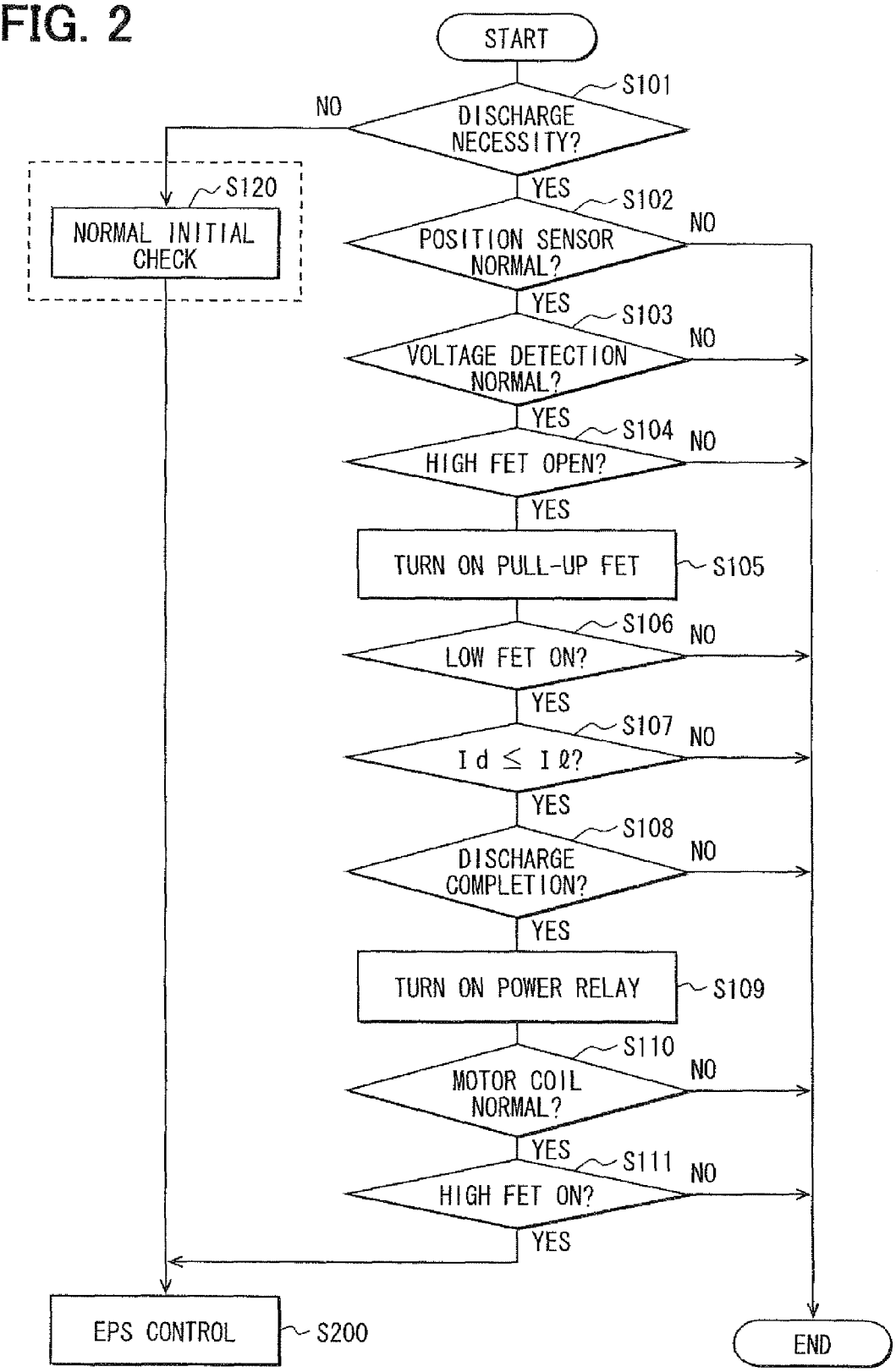
FIG. 2 is a flowchart showing check processing executed by the motor control apparatus according to the first embodiment.

The microcomputer 70 is programmed to execute a series of check processing shown in FIG. 2 before starting to drive the motor 10. In FIG. 2, S indicates a check processing step. This check processing is executed, for example, immediately after a driver of a vehicle turns on the ignition key 71 or immediately after occurrence of temporary interruption of electric power supply to the motor control apparatus 1 while the motor 10 is in rotation. At a time point, which is immediately after the ignition key 71 is turned on or immediately after the temporary interruption of electric power supply to the motor control apparatus 1 arises, the microcomputer 70 does not generate a turn-on command to the power supply relay 81 and hence the power supply relay 81 is in the open (turned-off) state. As a result, the current flow from the battery 80 to the capacitor 60 and the motor 10 is not permitted. That is, the check processing shown in FIG. 2 is executed under a condition that the current flow is being interrupted, that is, electric connection between the power source and the motor side is interrupted.

In this check processing, first at S101, the microcomputer 70 checks whether it is necessary to discharge the electric charge stored in the capacitor 60. Specifically, the microcomputer 70 determines that the discharging is necessary when the capacitor voltage value Vc of the capacitor 60 detected by the capacitor voltage detection circuit 55 is equal to or greater than a predetermined value. If the discharging of the capacitor 60 is necessary (S101: YES), S102 is executed. If the discharging of the capacitor 60 is not necessary (S101: NO), S120 is executed.

At S102, the microcomputer 70 checks whether the position sensor 79 is normal and has no abnormality (failure). If the position sensor 79 is normal (S102: YES), S103 is executed. If the position sensor 79 is not normal and has abnormality (S102: NO), the check processing is finished. At S103, the microcomputer 70 checks whether the terminal voltage detection circuit 50 is normal and has no abnormality. If the terminal voltage detection circuit 50 is normal (S103: YES), S104 is executed. If the terminal voltage detection circuit 50 is not normal and has abnormality (S103: NO), the check processing is finished.

At S104, the microcomputer 70 checks whether the high-side FETs 21 to 23 are open (turned off). That is, the microcomputer 70 checks whether any of the high-side FETs 21 to 23 has a short-circuit. In this check operation, the microcomputer 70 checks whether the following relations (1) to (3) are satisfied under a condition that the rotation speed of the motor 10 is equal to or less than a predetermined value. The rotation speed of the motor 10 is calculated based on detection values of the position sensor 79. In the following relations, the terminal voltage detection values of the voltage sensors 51 to 53 are indicated as Vu, Vv and Vw, respectively. The capacitor voltage detection value of the capacitor voltage detection circuit 55 is indicated as Vc.

$$Vu \neq Vc \times (Rhc+Rlc)/Rlc \times Rlu/(Rhu+Rlu+Rpu) \quad (1)$$

$$Vv \neq Vc \times (Rhc+Rlc)/Rlc \times Rlv/(Rhv+Rlv+Rpu) \quad (2)$$

$$Vu \neq Vc \times (Rhc+Rlc)/Rlc \times Rlw/(Rhw+Rlw+Rpu) \quad (3)$$

If all the relations (1) to (3) are satisfied with the rotation speed of the motor 10 being equal to or less than the predetermined value, the microcomputer 70 determines that the high-side FETs 21 to 23 are normal and have no short-circuits (S104: YES). If either one of the relations (1) to (3) is not satisfied, the microcomputer 70 determines that either one of the high-side FETs 21 to 23 is abnormal and has a short-circuit (S104: NO). It is also possible at S104 to check whether the high-side FETs 21 to 23 are normal or abnormal by checking whether the detection voltage values remain within a predetermined range, which is set in correspondence to temperature characteristics and variations of resistances.

At S105, the microcomputer 70 turns on the low-side FET 25 of the V-phase, which is pulled up by the pull-up resistor 90. That is, the microcomputer 70 turns on the V-phase low-side FET 25 by applying a turn-on signal to the V-phase low-side FET 25. The V-phase low-side FET 25 turns on in response to the turn-on signal from the microcomputer 70, if the V-phase low-side FET 25 is normal.

The microcomputer 70 checks at S106 whether the low-side FET 25 turned on (became conductive). Specifically, the microcomputer 70 checks whether all the voltage detection values of the voltage sensors 51, 52 and 53 are equal to or less than a predetermined value (for example, ground voltage). If all the voltage detection values are equal to or less than the predetermined value, it is determined that the V-phase low-side FET 25 turned on (S106: YES). S107 is then executed. When the V-phase low-side FET 25 is turned on, the electric charge remaining in the capacitor 60 is discharged to the low potential side of the battery 80, that is, the ground, through the pull-up resistor 90 and the V-phase low-side FET 25. If any one of the voltage detection values of the sensor 51, 52 and 53 are greater than the predetermined value, it is determined that the V-phase low-side FET 25 was not turned on (S106: NO). In this case, the check processing is finished.

At S107, the microcomputer 70 checks whether all the current detection values Id of the current sensors 41, 42 and 43 are equal to or less than a predetermined limit value Il. If all the current detection values Id are equal to or less than the predetermined limit value Il, it is determined that the inverter circuit 20 is normal (S107: YES). S108 is then executed. If either one of the current detection values Id of the sensors 41, 42 and 43 are greater than the predetermined limit value Il, it is determined that the inverter circuit 20 is not normal (S107: NO). For example, if the high-side FET 22 of the pulled-up V-phase is short-circuited, a large current flows in the high-side FET 22, the low-side FET 25 and the current sensor 42.

At S108, the microcomputer 70 checks whether the capacitor 60 has completed discharging of its remaining charge. Specifically, the microcomputer 70 checks whether the capacitor voltage detection value Vc detected by the detection circuit 55 falls to be lower than a predetermined value within a predetermined time. If the capacitor voltage detection value falls to be lower than the predetermined value within the predetermined time, the microcomputer 70 determines that the discharging was completed normally (S108: YES) and turns off the V-phase low-side FET 25. Then S109 is executed.

If the capacitor voltage detection value Vc does not fall to be lower than the predetermined value within the predetermined time, the microcomputer 70 determines that the discharging was not completed normally (S108: NO) and turns off the V-phase low-side FET 25. The check processing is finished. If the discharging was completed normally (S108: YES), the microcomputer 70 determines that no short-circuit failure is present in the power supply relay 81. If the discharging was not completed normally (S108: NO), the microcomputer 70 determines that a short-circuit failure is present in the power supply relay 81.

At S109, the microcomputer 70 turns on the power supply relay 81. The computer 70 controls the power supply relay 81 to turn on by applying the turn-on command signal to the power supply relay 81. Then S110 is executed.

At S110, the microcomputer 70 checks whether the windings of the motor 10 are normal. Specifically, this check is made by checking whether all of the phase coils (U-phase coil 11, V-phase coil 12 and W-phase coil 13) have no disconnection based on the voltage values of the phase terminals detected by the terminal voltage detection circuit 50 (sensors 51, 52 and 53). If the windings are determined to be normal (S110: YES), S111 is executed. If either one of the windings has abnormality (S110: NO), the check processing is finished. If the terminal voltage value of each phase is normal, it can be determined at the same time that the low-side FETs 24 to 26 are all normal.

The microcomputer 70 checks at S111 whether the high-side FET turns on (became conductive) normally. Specifically, the microcomputer 70 checks whether all the high-side FETs 21 to 23 normally turn on based on the voltage detection values of the terminal voltage detection circuit 50 when the turn-on signals are applied to the high-side FETs 21 to 23. If all the high-side FETs 21 to 23 are determined to be normal (S111: YES), the EPS control is started at S200. In the EPS control, the electric power steering system is driven in the conventional manner. If either one of the high-side FETs 21 to 23 is determined to be abnormal (S111: NO), the check processing is finished.

At S120, which is executed following S101 (NO), the microcomputer 70 executes normal initial check to confirm an abnormality in the power supply relay 81, windings and the like. After S120, the EPS control is started at S200.

As described above, the check processing is finished immediately if a certain abnormality is determined at either one of S102 to S104, S106 to S108, S110 and S111. It is possible to store in a memory unit of the microcomputer 70 or notify to a driver of a vehicle visually or audibly any abnormality determined as described above.

According to the first embodiment, the microcomputer 70 turns on the low-side FET 25 of the pull-up phase (V-phase) with the power supply relay 81 being controlled to the off-state to interrupt the current flow from the battery 80 to the capacitor 60 and the motor 10 before the motor 10 is started. Thus, the electric charge stored in the capacitor 60 is discharged to the low potential side of the battery 80 (ground) through the pull-up resistor 90. Thus, only one pull-up resistor 90 is required as a physical element to discharge the electric charge of the capacitor 60 and no complicated circuit is required exclusively for discharging of the capacitor 60. The motor control apparatus 1 thus need not be sized large. The discharging can be controlled relatively simply by the microcomputer 70. As a result, the electric charge of the capacitor 60 provided for ripple current suppression can be discharged quickly in a simple configuration.

In addition, the terminal voltage detection circuit 50 is provided for detecting terminal voltages of each phase of the windings of the motor 10. The computer 70 detects abnormality of the winding (U-phase coil 11, V-phase coil 12 and W-phase coil 13) based on the voltage detected by the terminal voltage detection circuit 50. In case of the motor control apparatus 1 having the pull-up resistor 90, abnormality such as disconnection of the winding can be detected by detecting the terminal voltage of each phase of the windings. That is, one resistor (pull-up resistor 90) is used in common as a high-side resistor for discharging the electric charge of the capacitor 60 and a high-side resistor for detecting abnormality of the windings. Thus, the electric charge of the capacitor 60 can be discharged in a simple configuration and the abnormality of the windings can be detected without increase in costs.

Further, the capacitor voltage detection circuit 55 is provided for detecting the voltage of the capacitor 60. The microcomputer 70 turns on the low-side FET 25 of the pull-up phase (V-phase) with the power supply relay 81 being controlled to the off-state to interrupt the current flow before the motor 10 is started. In this case, the microcomputer 70 confirms that the high-side FETs 21 to 23 are all in the off-state when the voltage of the capacitor 60 detected by the capacitor voltage detection circuit 55 is equal to or greater than the predetermined value. Thus, the electric charge stored in the capacitor 60 is discharged to the low potential side of the battery 80 (ground) through the pull-up resistor 90. The microcomputer 70 determines whether the electric charge of the capacitor 60 is to be discharged by detecting the voltage of the capacitor 60. When the capacitor 60 is determined to discharge its stored charge, the electric charge of the capacitor 60 is discharged after confirming that the high-side FETs 21 to 23 have no abnormality of short-circuit failure.

Thus, it is possible to detect the discharge time point accurately and to prevent excessive current from flowing in the high-side FET, which is in the short-circuit failure. The V-phase low-side FET 25, which is controlled to turn on, is protected from breaking down by the excessive current.

The motor control apparatus 1, which is capable of quickly discharging the capacitor 60 provided for ripple current suppression, is used in the electric power steering system. This motor control apparatus 1 is therefore particularly of advantage in the electric power steering system, in which the motor 10 need be started to operate immediately after the electric power is resumed following the temporary interruption of the electric power.

Second Embodiment

Figure 3:
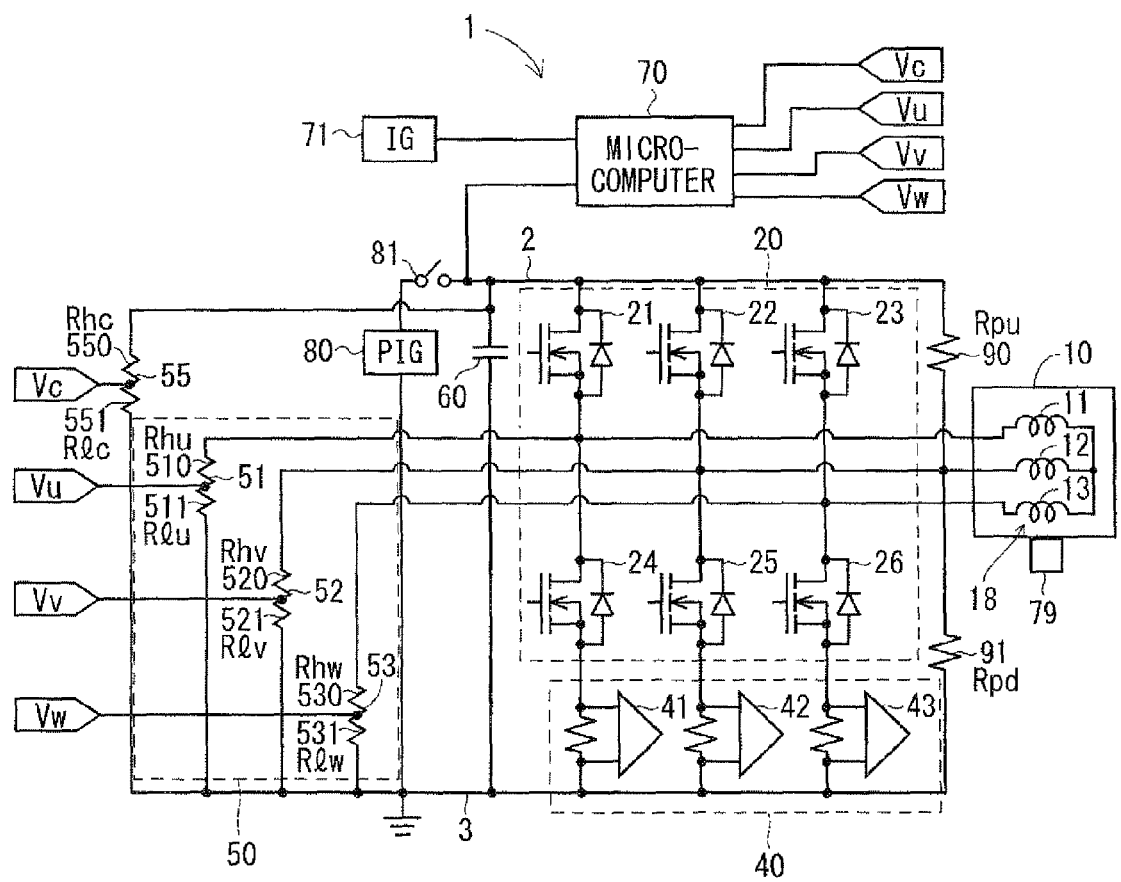
FIG. 3 is a circuit diagram showing a motor control apparatus according to a second embodiment of the present invention.

According to a second embodiment shown in FIG. 3, the motor control apparatus 1 has a low-side resistor (pull-down resistor 91) in addition to the high-side resistor (pull-up resistor 90).

The resistance of the pull-up resistor 90 is preferably small to shorten the discharge time of the capacitor 60. If the resistance of the pull-up resistor 90 is small, a difference between terminal voltages developed when the high-side FET is short-circuited and normal (not short-circuited). As a result, it becomes difficult to confirm the open state of the high-side FETs 21 to 23 (for example S104 in FIG. 2).

The control apparatus 1 in the second embodiment has the pull-down resistor 95 as the low-side resistor. The pull-down resistor 91 connects the V-phase coil 12, which is the V-phase winding of the motor 10, and the low potential side of the battery 80 (ground). That is, the V-phase coil 12 is pulled up by the pull-up resistor 90 and pulled down by the pull-down resistor 91. Thus, the terminal voltage developed when the high-side FET is short-circuited and the terminal voltage developed when the high-side FET is normal and not short-circuited differ largely. As a result, it becomes easier to confirm the open-state of the high-side FETs 21 to 23.

The pull-down resistor 91 has a resistance larger than that of the pull-up resistor 90 so that the discharge current is more likely to flow in the pull-up resistor 90 when the capacitor 60 is discharged. The resistance of the pull-down resistor 91 is indicated as Rpd.

Figure 4A:
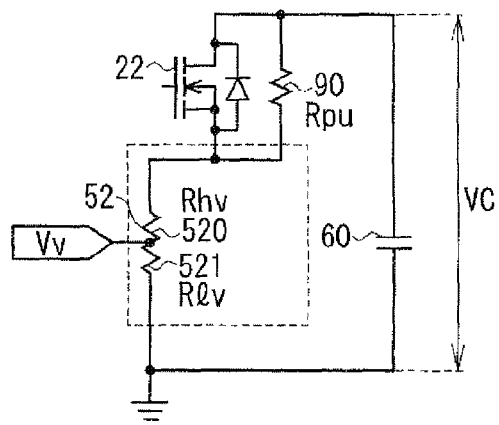
FIGS. 4A, 4B, 4C and 4D are schematic diagrams showing equivalent circuits in a normal case of the first embodiment, a short-circuit failure case of a high-side switching element of the first embodiment, a normal case of the second embodiment, and a short-circuit failure case of the high-side switching element of the first embodiment, respectively.
Figure 4B:
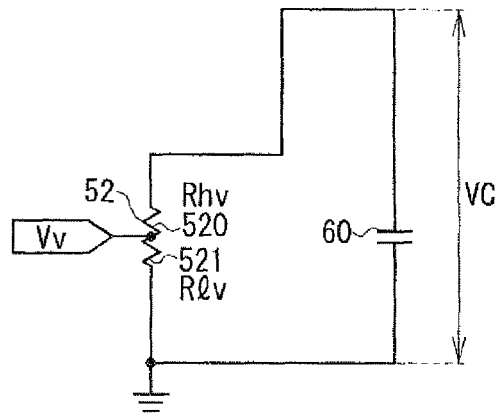
Figure 4C:
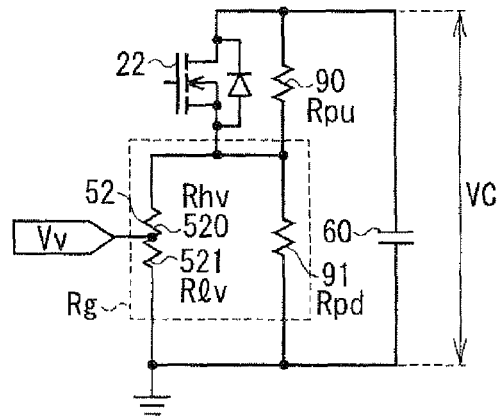
Figure 4D:
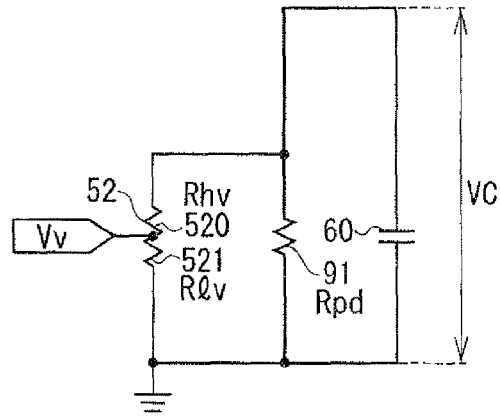

The second embodiment provides a larger difference between the terminal voltages developed when the high-side FET is short-circuited and not short-circuited than the first embodiment does for the following reason described with reference to FIGS. 4A to 4D. FIG. 4A shows an equivalent circuit when the high-side FET is normal in the first embodiment, in which only the pull-up resistor 90 is provided. FIG. 4B shows an equivalent circuit when the high-side FET is short-circuited in the first embodiment. FIG. 4C shows an equivalent circuit when the high-side FET is normal in the second embodiment, in which both the pull-up resistor 90 and the pull-down resistor 91 are provided. FIG. 4D shows an equivalent circuit when the high-side FET is short-circuited in the second embodiment. It is assumed here that Rhv is 1 k$\Omega$, Rlv is 1 k$\Omega$, Rpu is 100$\Omega$, Rpd is 1 k$\Omega$, 1 k is 1,000 and VC is Vc×(Rhc+Rlc)/Rlc.

As understood from FIG. 4A, the terminal voltage Vv of the V-phase when the high-side FET is normal in the first embodiment is expressed as follows.

$$VC \times Rlv/(Rhv+Rlv+Rpu) = VC \times 1 \; k/(1 \; k+1 \; k+100) = VC \times 10/21 \quad (4)$$

As understood from FIG. 4B, the terminal voltage Vv of the V-phase when the high-side FET is short-circuited in the first embodiment is expressed as follows.

$$VC \times Rlv/(Rhv+Rlv) = VC \times 1/2 \quad (5)$$

The difference between the terminal voltages Vc when the high-side FET is short-circuited and normal in the first embodiment is expressed as follows.

$$VC \times 1/2 - VC \times 10/21 \approx 0.024 \times VC \quad (6)$$

As understood from FIG. 4C, the terminal voltage Vv of the V-phase when the high-side FET is normal in the second embodiment is expressed as follows, in which Rg indicates a composite resistance of the resistors 52 and 91 connected in parallel.

$$VC \times Rg/(Rg+Rpu) \times Rlv/(Rhv+Rlv) = \\ VC \times 2k/3/(2k/3+100) \times 1k/(1k+1k) = \\ VC \times 2000/2300 \times 1/2 = VC \times 10/23 \quad (7)$$

In equation (7), the resistance Rg is expressed as follows.

$$Rg = 1/\{1/(Rhv+Rlv)+1/Rpd\} = 1/\{1/(1 \; k+1 \; k)+1/1 \; k\} = 2 \; k/3 \quad (8)$$

As understood from FIG. 4D, the terminal voltage Vv of the V-phase when the high-side FET is short-circuited in the second embodiment is expressed as follows.

$$VC \times Rd/(Rhv+Rlv) = VC \times 1 \; k/(1 \; k+1 \; k) = VC \times 1/2 \quad (9)$$

The difference between the terminal voltages Vc when the high-side FET is short-circuited and normal in the second embodiment is expressed as follows.

$$VC \times 1/2 - VC \times 10/23 \approx 0.065 \times VC \quad (10)$$

From the equations (6) and (10), it is understood that the second embodiment provides a larger difference between the terminal voltages Vv developed when the high-side FET is short-circuited and normal than the first embodiment.

Since the larger difference is provided in the second embodiment as described above, the open-states of the high-side FETs 21 to 23 can be confirmed at S104 more accurately.

Third Embodiment

Figure 5:
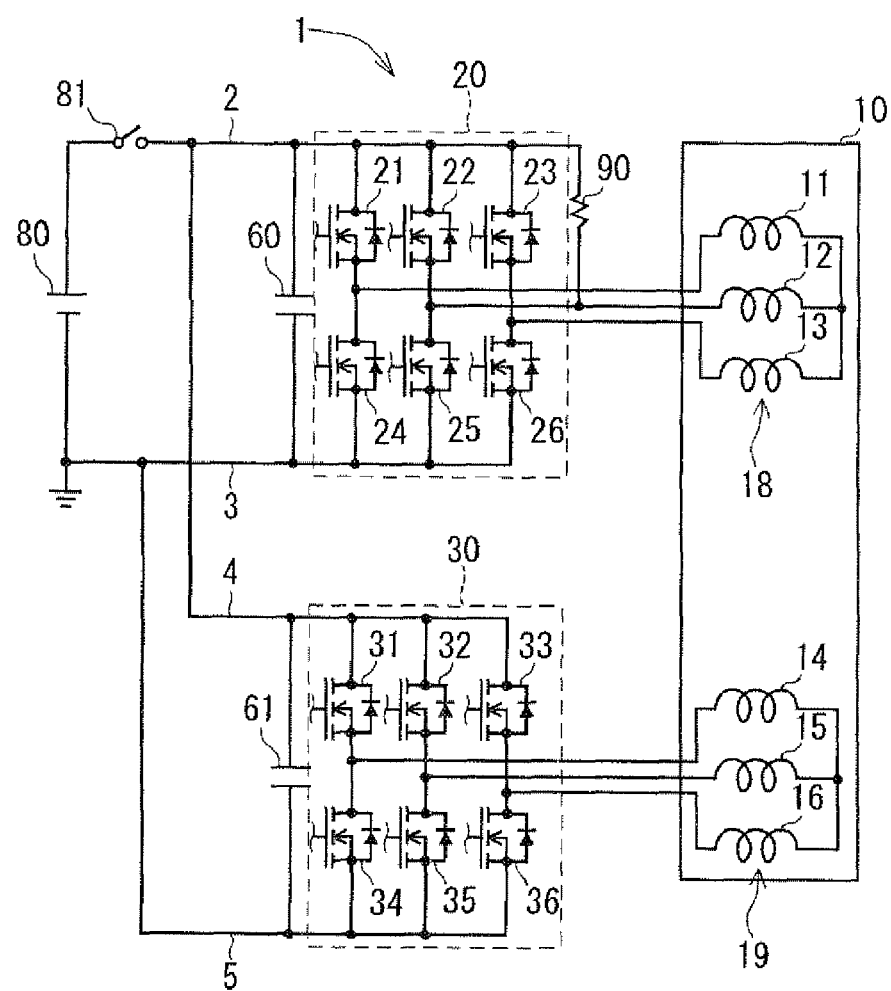
FIG. 5 is a circuit diagram showing a motor control apparatus according to a third embodiment of the present invention.

According to a third embodiment shown in FIG. 5, the motor control apparatus 1 has a plurality of inverter circuits. For brevity, the current detection circuit 40, the terminal voltage detection circuit 50, the capacitor voltage detection circuit 55 and the microcomputer 70 are not shown in FIG. 5.

Specifically, in the third embodiment, another (second) inverter circuit 30 is provided in addition to the first inverter circuit 20. The motor control apparatus 1 thus has a plurality of (two) inverter circuits as power conversion circuits. In correspondence to the inverter circuit 30, the motor 10 is also provided with another winding set 19, which is formed of a U-phase coil 14, a V-phase coil 15 and a W-phase coil 16, in addition to the winding set 18. The motor 10 thus has two winding sets 18 and 19.

The inverter circuit 30 is also a three-phase inverter circuit as the inverter circuit 20. In the inverter circuit 30, six switching elements 31 to 36 are connected in a bridge form to turn on or off the current supply to the U-phase coil 14, the V-phase coil 15 and the W-phase coil 16 of the winding set 19. The switching elements 31 to 36 are MOSFETs like the switching elements 21 to 26 are. The switching elements 31 to 36 are referred to as FETs 31 to 36, respectively.

Drains of the FETs 31 to 33 are connected to a positive bus 4. The positive bus 4 is connected to the positive bus 2 at a point between the power supply relay 81 and the capacitor 60. Sources of the FETs 31 to 33 are connected to drains of the FETs 34 to 36, respectively. Sources of the FETs 34 to 36 are connected to a negative bus 5. The negative bus 5 is connected to the negative bus 3, that is, the negative side of the battery 80 (ground).

The FETs 31 and 34 are paired and a junction therebetween is connected to one end of the U-phase coil 14. The FETs 32 and 35 are paired and a junction therebetween is connected to one end of the V-phase coil 15. The FETs 33 and 36 are paired and a junction therebetween is connected to one end of the W-phase coil 16.

A capacitor 61 is connected between the positive bus 4 and the negative bus 5. That is, the capacitor 61 is connected between the battery 80 and the inverter circuit 30. The capacitor 61 stores electric charge therein to supplement power supply to the FETs 31 to 36 and suppress ripple currents, which are generated when electric power is supplied from the battery 80 to the motor 10 (winding set 19).

According to the third embodiment, the electric charge remaining in the capacitor 61 is discharged through the pull-up resistor 90 before the motor 10 is started to operate. That is, at the same time as the electric charge of the capacitor 60 is discharged through the pull-up resistor 90 by turning on the V-phase low-side FET 25, the electric charge of the capacitor 61 also is discharged through the pull-up resistor 90 and the V-phase low-side FET 25. Thus, even if the second inverter circuit 30 has no pull-up resistor, the capacitor 61 is enabled to discharge its remaining charge through the high-side resistor (pull-up resistor 90) of the first inverter circuit 20.

Since a plurality of inverter circuits (first inverter circuit 20 and second inverter circuit 30) is provided in the third embodiment, driving load can be shared. Further, even if one of the inverter circuits 20 and 30 fails, the motor 10 can be continuously driven by the other inverter. Both the capacitors 60 and 61 are discharged by one pull-up resistor 90. As a result, the motor control apparatus 1 can be provided without large increase in size and cost.

Fourth Embodiment

Figure 6:
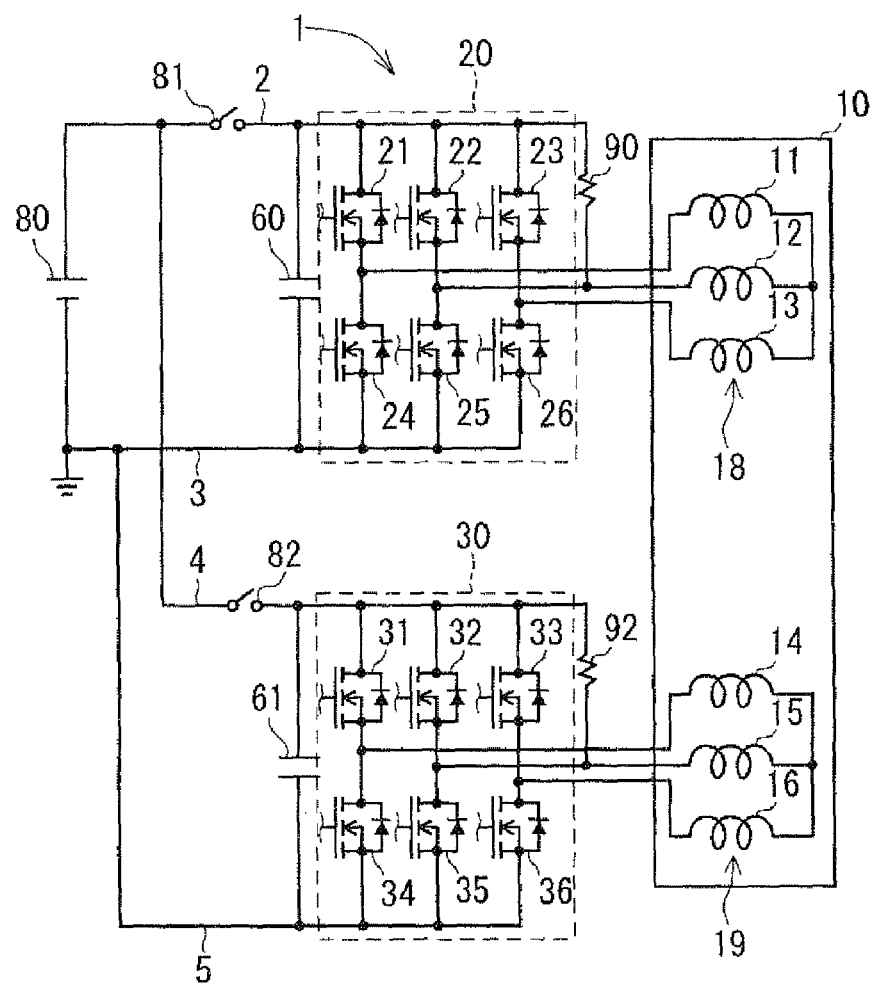
FIG. 6 is a circuit diagram showing a motor control apparatus according to a fourth embodiment of the present invention.

According to a fourth embodiment shown in FIG. 6, the motor control apparatus 1 has another (second) power supply relay 82 and another pull-up resistor 92 for the second inverter circuit 30 relative to the third embodiment. For brevity, the current detection circuit 40, the terminal voltage detection circuit 50, the capacitor voltage detection circuit 55 and the microcomputer 70 are not shown in FIG. 5.

In the fourth embodiment, the positive bus 4 is connected to the positive bus 2 at a point between the battery 80 and the power supply relay 81. A power supply relay 82 is provided between the battery 80 and the capacitor 61. The power supply relay 82 is turned on and off by the microcomputer 70 to permit and interrupt current flow between the battery 80 and the winding set 19, respectively. The pull-up resistor 91 is provided as a high-side resistor to connect the V-phase coil 15 of the V-phase of the winding set 19 and the positive bus 4.

According to the fourth embodiment, the electric charge remaining in the capacitor 61 is discharged through the pull-up resistor 91 before the motor 10 is started to operate. That is, the electric charge of the capacitor 61 is discharged through a discharge path, which is different from that of the capacitor 60. Thus, the capacitors 60 and 61 can be discharged in a shorter time than in the third embodiment.

Since a plurality of inverter circuits (first inverter circuit 20 and second inverter circuit 30) is provided in the similar manner as in the third embodiment, driving load can be shared. Further, even if one of the inverter circuits 20 and 30 fails, the motor 10 can be continuously driven by the other inverter. Since only one high-side resistor is provided for each inverter circuit, for example, the number of parts can be reduced to a minimum even if a plurality of inverter circuits is provided.

Other Embodiments

The foregoing embodiments may be modified in many ways.

Figure 7A:
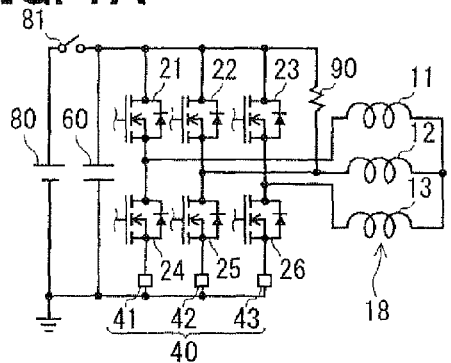
FIGS. 7A to 7H are circuit diagrams showing positions of a current detection circuit in the motor control apparatus of the first embodiment and other embodiments, respectively.

The current detection circuit 40 may be provided differently from the foregoing embodiments, in which the current detection circuit for each inverter circuit is formed of current sensors 41 to 43 and provided in the low-side of the inverter as exemplarily shown in FIG. 7A.

Figure 7B:
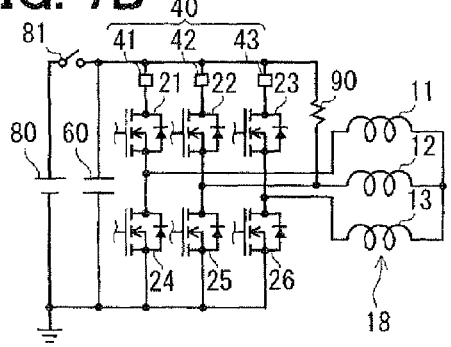
Figure 7C:
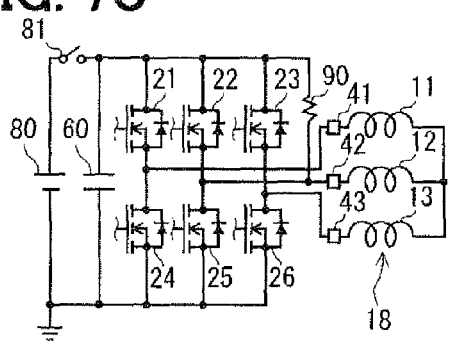
Figure 7D:
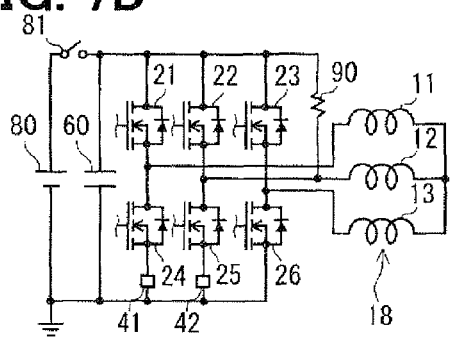
Figure 7E:
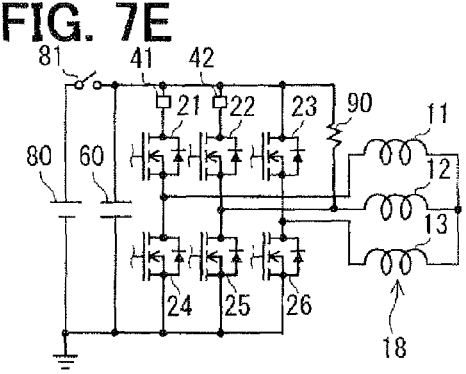
Figure 7F:
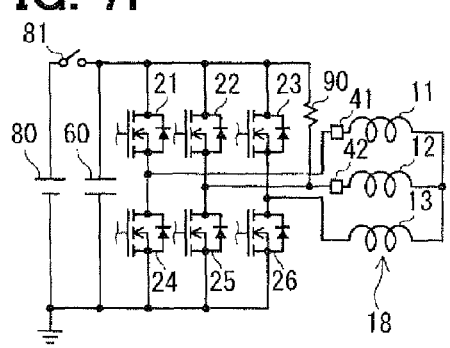
Figure 7G:
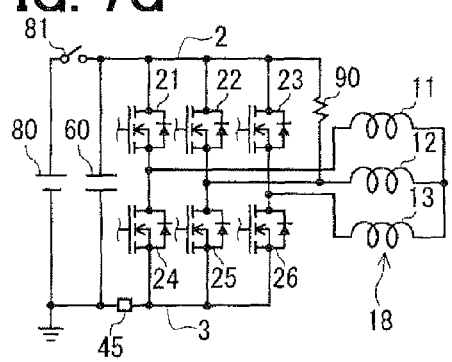
Figure 7H:
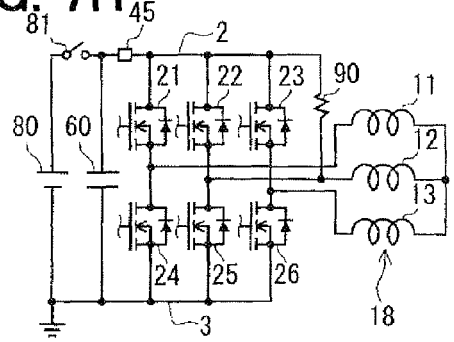

For example, as shown in FIG. 7B, the current sensors 41 to 43 of the current detection circuit 40 may be provided at the high-sides of the high-side FETs 21 to 23. As shown in FIG. 7C, the current sensors 41 to 43 of the current detection circuit 40 may be provided between the inverter circuit 20 and the winding set 18. As shown in FIGS. 7D, 7E and 7F, the current detection circuit 40 may include only two current sensors 41 and 42, which are provided for only the U-phase and the V-phase. As shown in FIGS. 7G and 7H, the current detection circuit 40 may include only one current sensor 45, which is provided in only one of the negative bus 3 and the positive bus 2 at a position between the capacitor 60 and the inverter circuit 20. According to the arrangements shown in FIGS. 7A, 7B, 7D, 7E, 7G and 7H, the current detection circuit 40 can detect currents flowing in the discharge operation. As a result, circuit abnormality in the discharging operation can be detected (S107 in FIG. 2).

Further, the foregoing embodiments may be modified as shown in FIGS. 8A to 8D.

Figure 8A:
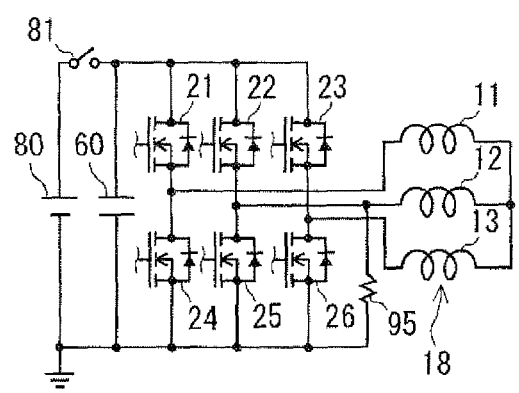
FIGS. 8A, 8B, 8C and 8D are circuit diagrams showing a motor control apparatus, which is provided with only a low potential-side resistor, which is provided with two switching element pair for a brushless or brush-type motor, which is provided with a high-side resistor and controls a multi-phase motor supplied with electric power from a neutral point, and which is provided with a low-side resistor and controls the multi-phase motor supplied with electric power from the neutral point, respectively.

As shown in FIG. 8A, only a low-side resistor (pull-down resistor 95) may be provided without the high-side resistor (pull-up resistor 90). The pull-down resistor 95 connects the V-phase coil 12 of the V-phase of the winding set 18 and the low-side of the battery 80 (ground). In this modification, the electric charge of the capacitor 60 is discharged to the ground through the V-phase high-side FET 22 and the pull-down resistor 91 by turning on the V-phase high-side FET 22.

Figure 8B:
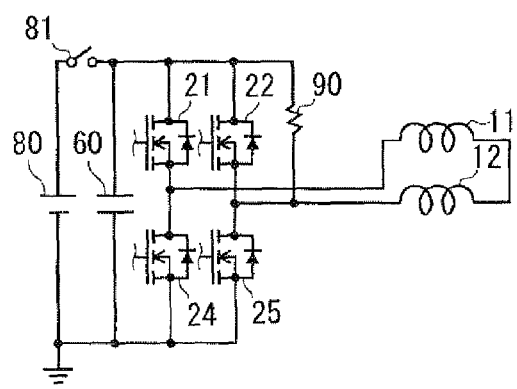

As shown in FIG. 8B, the motor 10 and the inverter circuit 20 may have only two phases. The pull-up resistor 90 is connected to the V-phase coil 12 and the high potential side of the battery 80.

Figure 8C:
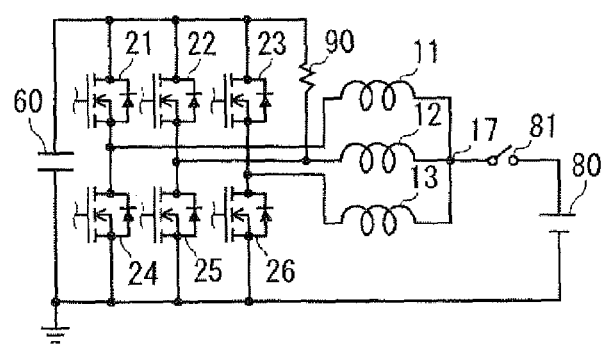
Figure 8D:
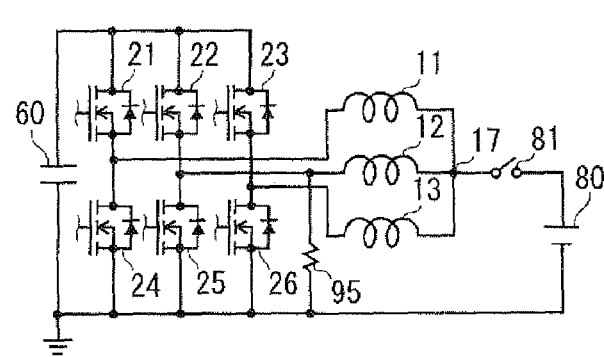

As shown in FIGS. 8C and 8D, the battery 80 may be connected to a neutral point 17 of the winding set 18 through the power supply relay 81.

The coils 11 to 13 need not be connected in a Y-shape but may be connected in a Δ-shape.

The motor control apparatus may be used in not only the electric power steering system but also any other motor-operated systems.

What is claimed is:

1. A motor control apparatus for controlling a motor, which has a winding set of a plurality of phase coils and is driven by electric power supplied from a power source, the motor control apparatus comprising:
   an electric power converter circuit for converting the electric power supplied to the motor, the electric power converter including a plurality of pairs of switching elements provided in correspondence to the plurality of phase coils, each pair of switching elements including a high-side switching element and a low-side switching element provided at a high potential side and a low potential side of the power source, respectively;
   a capacitor connected between the power source and the electric power converter circuit;
   a high-side resistor connected between a predetermined one of the phase coils and the high potential side of the power source;
   a power supply relay connected to permit and interrupt current flow from the power source to the capacitor and the motor; and
   a control circuit provided to control operation of the power supply relay and driving of the motor by turning on and off the switching elements,
   wherein the control circuit is configured to discharge electric charge stored in the capacitor to the low potential side of the power source through the high-side resistor before the motor is started to operate, by turning on the low-side switching element of the predetermined one of the phase coils under a condition that the power supply relay interrupts the current flow from the power source.

2. The motor control apparatus according to claim 1, further comprising:
   a low-side resistor connected between the predetermined one of the phase coils and the low potential side of the power source.

3. The motor control apparatus according to claim 2, wherein:
   the low-side resistor has a resistance larger than that of the high-side resistor.

4. The motor control apparatus according to claim 2, further comprising:
   a terminal voltage detection circuit provided to detect a terminal voltage of each phase of the winding set,
   wherein the control circuit is configured to determine abnormality in the winding set based on the terminal voltage detected by the terminal voltage detection circuit.

5. The motor control apparatus according to claim 2, further comprising:
   a capacitor voltage detection circuit provided to detect a voltage of the capacitor,
   wherein the control circuit is configured to discharge the electric charge stored in the capacitor to the low potential side of the power source through the high-side resistor by turning on the low-side switching element of the predetermined one of the phase coils, after confirming that all the high-side switching elements are in an off-state when the voltage of the capacitor detected by the capacitor voltage detection circuit is higher than a predetermined value.

6. The motor control apparatus according to claim 1, further comprising:
a terminal voltage detection circuit provided to detect a terminal voltage of each phase of the winding set,
wherein the control circuit is configured to determine abnormality in the winding set based on the terminal voltage detected by the terminal voltage detection circuit.

7. The motor control apparatus according to claim 6, further comprising:
a capacitor voltage detection circuit provided to detect a voltage of the capacitor,
wherein the control circuit is configured to discharge the electric charge stored in the capacitor to the low potential side of the power source through the high-side resistor by turning on the low-side switching element of the predetermined one of the phase coils, after confirming that all the high-side switching elements are in an off-state when the voltage of the capacitor detected by the capacitor voltage detection circuit is higher than a predetermined value.

8. The motor control apparatus according to claim 6, further comprising:
a capacitor voltage detection circuit provided to detect a voltage of the capacitor,
wherein the control circuit is configured to discharge the electric charge stored in the capacitor to the low potential side of the power source through the low-side resistor by turning on the high-side switching element of the predetermined one of the phase coils, after confirming that all the low-side switching elements are in an off-state when the voltage of the capacitor detected by the capacitor voltage detection circuit is higher than a predetermined value.

9. The motor control apparatus according to claim 1, further comprising:
a capacitor voltage detection circuit provided to detect a voltage of the capacitor,
wherein the control circuit is configured to discharge the electric charge stored in the capacitor to the low potential side of the power source through the high-side resistor by turning on the low-side switching element of the predetermined one of the phase coils, after confirming that all the high-side switching elements are in an off-state when the voltage of the capacitor detected by the capacitor voltage detection circuit is higher than a predetermined value.

10. The motor control apparatus according to claim 1, wherein:
the power converter circuit includes a plurality of inverters for a plurality of winding sets of the motor provided in correspondence to the plurality of inverters.

11. The motor control apparatus according to claim 10, wherein:
the high-side resistor is provided in only one of the plurality of the inverters.

12. An electric power steering system comprising:
the motor control apparatus according to claim 1; and
the motor.

13. A motor control apparatus for controlling a motor, which has a winding set of a plurality of phase coils and is driven by electric power supplied from a power source, the motor control apparatus comprising:
an electric power converter circuit provided for each winding set for converting the electric power supplied to the motor, the electric power converter including a plurality of pairs of switching elements provided in correspondence to the plurality of phase coils, each pair of switching elements including a high-side switching element and a low-side switching element provided at a high potential side and a low potential side of the power source, respectively;
a capacitor connected between the power source and the electric power converter circuit;
a low-side resistor connected between a predetermined one of the phase coils and the low potential side of the power source;
a power supply relay connected to permit and interrupt current flow from the power source to the capacitor and the motor; and
a control circuit provided to control operation of the power supply relay and driving of the motor by turning on and off the switching elements,
wherein the control circuit is configured to discharge electric charge stored in the capacitor to the low potential side of the power source through the low-side resistor before the motor is started to operate, by turning on the high-side switching element of the predetermined one of the phase coils under a condition that the power supply relay interrupts the current flow from the power source.

14. The motor control apparatus according to claim 13, further comprising:
a high-side resistor connected between the predetermined one of the phase coils and the high potential side of the power source.

15. The motor control apparatus according to claim 14, further comprising:
a terminal voltage detection circuit provided to detect a terminal voltage of each phase of the winding set,
wherein the control circuit is configured to determine abnormality in the winding set based on the terminal voltage detected by the terminal voltage detection circuit.

16. The motor control apparatus according to claim 14, further comprising:
a capacitor voltage detection circuit provided to detect a voltage of the capacitor,
wherein the control circuit is configured to discharge the electric charge stored in the capacitor to the low potential side of the power source through the low-side resistor by turning on the high-side switching element of the predetermined one of the phase coils, after confirming that all the low-side switching elements are in an off-state when the voltage of the capacitor detected by the capacitor voltage detection circuit is higher than a predetermined value.

17. The motor control apparatus according to claim 13, further comprising:
a capacitor voltage detection circuit provided to detect a voltage of the capacitor,
wherein the control circuit is configured to discharge the electric charge stored in the capacitor to the low potential side of the power source through the low-side resistor by turning on the high-side switching element of the predetermined one of the phase coils, after confirming that all the low-side switching elements are in an off-state when the voltage of the capacitor detected by the capacitor voltage detection circuit is higher than a predetermined value.

* * * * *